March 25, 1941.    O. STORZ    2,236,481
SELF-CONTAINED ROLLER BEARING
Filed Feb. 20, 1939
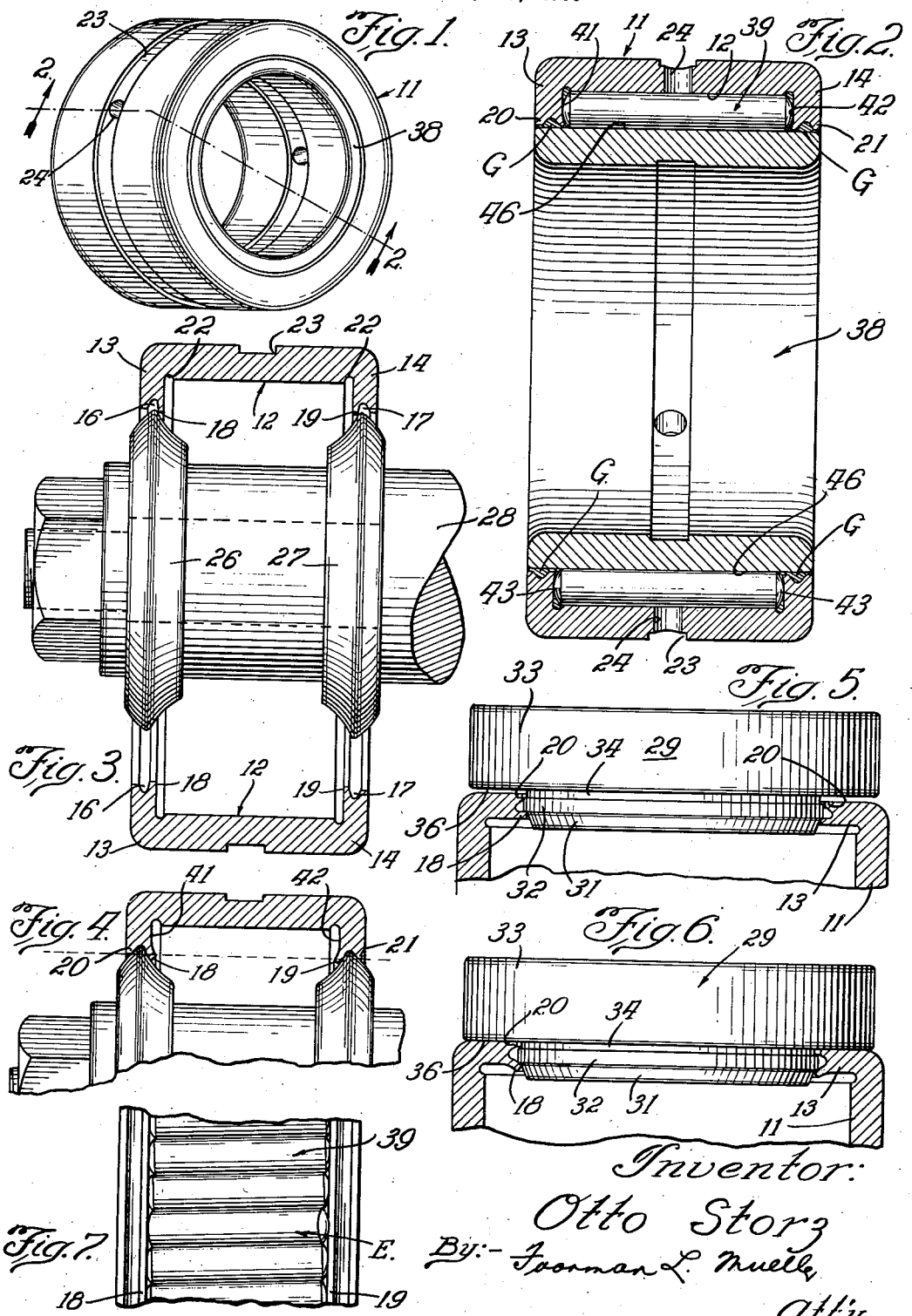
Inventor:
Otto Storz
By: Foorman L. Mueller
Att'y.

Patented Mar. 25, 1941

2,236,481

UNITED STATES PATENT OFFICE 2,236,481

SELF-CONTAINED ROLLER BEARING

Otto Storz, Valparaiso, Ind., assignor to McGill Manufacturing Company, Valparaiso, Ind., a corporation of Indiana Application February 20, 1939, Serial No. 257,393

6 Claims. (Cl. 308—213)

My invention relates to bearings and more particularly to a self-contained antifriction roller bearing, and a method, and apparatus for making the same.

Due to the ease of handling, and general efficiency of self-contained roller bearings, they are extremely desirable in many different applications for bearings. However, the difficulties to be overcome in providing for excessive wear on the side walls of the raceways at the ends of the rollers due to the end thrust forces on the rollers have resulted in relatively complicated and expensive devices. Race and roller construction to overcome this difficulty has in many instances reduced the effective length of the rollers and in turn reduced the load capacity of the bearing. Furthermore, although a roller with a spherical end is generally considered to be the most desirable in a roller bearing, the difficulty of retaining such a bearing in a raceway and at the same time provide sufficient strength in the side walls for the raceways has caused the prior commercial art to employ less desirable roller configuration.

An object of my invention is to provide an improved self-contained roller bearing with a one-piece roller retaining race ring.

Another object of my invention is to provide a simple, inexpensive, and efficient method and apparatus for making the roller-retaining raceway for such a bearing.

A further object of my invention is to provide a one-piece roller-retaining race ring which is simple, extremely sturdy, for a long, effective life, and adapted to provide with its complementary race ring, highly efficient lubricating, and dirt excluding characteristics in a roller bearing.

A still further object of my invention is to provide a complete self-contained roller bearing with an extremely high load-bearing capacity.

One of the features of my invention is the provision of a simple method for manufacturing the roller-retaining race ring for my bearing and two different apparatuses for practicing the method.

A further feature of my invention is the provision of a self-contained roller bearing with a roller-retaining race ring, which although of only one piece, carries a full complement of rollers with all of the rollers extending entirely across the raceway in a transverse direction in a manner to provide a very high load-bearing capacity.

A still further feature of my invention is the provision of roller-retaining structure in a one-piece roller-retaining race ring which is yieldable enough to permit a full length roller as the last-to-be-inserted roller in the full roller complement to be snapped past such structure for insertion into the raceway, yet the structure returns to normal position and prevents that roller and the remaining rollers in the full complement for the bearing from falling from the raceway.

Further objects and features of my invention will be apparent from the following detailed description taken with the drawing wherein:

Fig. 1 is a perspective view of a complete roller bearing embodying my invention.

Fig. 2 is an enlarged view in normal cross-section along the line 2—2 in Fig. 1.

Fig. 3 is a cross-sectional view of one-half of the outer or roller-retaining race ring on a smaller scale than that for Fig. 2, showing the race ring in a preliminary stage of manufacturing with one of the apparatuses used for forming the roller-retaining structure of the race ring in practicing the method of my invention.

Fig. 4 is similar to Fig. 3, but showing the tool or apparatus in position after completing the forming operation.

Fig. 5 is a fragmentary view in cross-section showing another apparatus or tool for forming the roller-retaining structure in practicing my method.

Fig. 6 is similar to Fig. 5, but showing the tool in position after the forming operation.

Fig. 7 is a fragmentary view showing all except the last roller in place in the raceway, and with the last roller in position to be pressed into the raceway.

In practicing my invention a one-piece annular race ring is turned out of a piece of steel, preferably of high carbon content, in a configuration such as to provide an annular shoulder or flange on each side of the raceway in the race ring. Each flange has an annular grease groove therein with a rim on the outside of the groove in an axial direction, and an annular lip on the inside of the groove of smaller diameter than the rim. The lip of each flange is acted upon and pressed inwardly to an arcuate configuration to provide a somewhat yieldable roller retaining lip, and at the same time the grease groove is enlarged in size to accommodate more grease and provide for better lubrication and a better dirt seal in the completed bearing. The retaining lip may be formed by pressing it inwardly with a die in a punch-press. It may also be formed by a rolling tool to press it into the desired configuration. After the retaining lip is formed the race ring is hardened and the retaining lip ground down so that it has the same diameter as the grease groove rim.

The rollers are assembled in the completed raceway by placing the original rollers therein at an angle so as to pass the retaining lips. The last, or possibly the next to last and last rollers in the roller unit are placed several degrees from a right angle to the flanges with one end under a retaining lip. The other end, with a slightly twisting action by virtue of bearing against adjacent rollers in the roller complement, is then pressed past the opposite retaining lip with a snap action to be held in the raceway by the two lips.

Referring now to the drawing, I provide a one-piece outer race ring 11 having a raceway 12 intermediate its two sides. The race ring is originally turned out of a single piece of high carbon steel in a form to provide a pair of annular flanges 13 and 14 thereon. An annular grease groove 16 is provided in the flange 13 and a similar groove 17 is provided in the flange 14. The grease grooves 16 and 17 each have their outside surface beveled in such a configuration as to cause a minimum weakening of the flange at that portion and yet provide a substantial capacity therein as will be more fully explained. The inside wall of each groove is originally relatively straight as shown in Figs. 3 and 5 and extends into annular lips 18 and 19 on the two grooves 16 and 17, respectively. The diameter of the annular edge of each of the lips 18 and 19 is less than the corresponding diameter for the rims 20 and 21 defining the grease grooves 16 and 17 respectively, on the outside thereof. In fact, in one commercial embodiment of my invention, the diameter for each lip is approximately 3% less than that for the rims 20 and 21. In originally machining the outer race ring 11, lubricating channels 22 are provided in the raceway 12 and a lubricating channel 23 on the outside surface of the race ring 11 has oil holes 24 therein for communicating with the raceway on the inside of the race ring.

In substantially all applications for a roller bearing, the load is applied to the rollers in such a manner that the rollers are thrust in one direction or another axially of the bearing so as to bear with a considerable pressure against the retaining flanges for the bearing upon the race ring carrying the rollers therein. In addition, there is normally considerable skewing of the rollers in the raceway which causes different forces to be applied to the rollers, and onto the race ring structure. These various forces cause wear on the rollers and on the race ring. In some commercial structures, it has been found that these forces cause the rollers to actually wear down the retaining flanges therefor so that the rollers push directly through the same. On some roller configurations, particularly those having trunnions on the ends thereof, rollers have worn out at the trunnion portion under the application of these various forces to cause the roller assembly to jam and necessitate the replacement of the bearing. In overcoming these various problems in the present invention as mentioned briefly above, I employ a retaining race ring for the rollers having wide retaining flanges at the axial edges of the roller-carrying raceway so as to accommodate heavy end thrust forces without the rollers wearing through these flanges. The rollers themselves have spherical ends of a large radius making possible a point contact between the ends of each roller and the retaining flange thus reducing friction therebetween to a minimum, and at the same time providing the maximum sturdiness in each roller and increasing the effective length of the roller to a maximum. The latter provides for the greatest possible load-bearing capacity over the length of the roller.

In my invention the rollers are retained in a one-piece race ring as 11, which can be finally characterized as hardened throughout and ground, by means of the integral arcuate lips 18 and 19 which are formed or bent over from the configuration shown in Figs. 3 and 5 to the configuration illustrated in Figs. 2, 4 and 6. The forming is accomplished by rollers acting on the lips 18 and 19, as shown in Figs. 3 and 4, or by a die operating in a punch press, as illustrated in Figs. 5 and 6. As to the roller apparatus, this comprises a pair of rollers 26 and 27, with each shaped at its periphery to correspond to the desired shape of the corresponding grease groove and retaining lip after the completion of the forming operation. The rollers rotate freely on a shaft 28, and are spaced apart and retained at such spacing to correspond to the axial dimensions of the formed portions on the bearings. The race ring to be operated upon is carried in an appropriate rotatable support or jig. While applying pressure onto the rollers 26 and 27 through the shaft 28, the rollers by virtue of their configuration act on the lips 18 and 19 to bend such lips inwardly until they assume the arcuate shape shown in Fig. 4 corresponding in general to the inner arcuate surface of the rollers 26 and 27. As is shown in Fig. 3, the rollers 26 and 27 are of a smaller diameter than the inside diameter of the flanges 13 and 14 so that a race ring 11 when it is completed can be readily removed from the rollers.

In accordance with my invention the forming or bending of the retaining lips can also be accomplished by means of a die or tool 29 supported in the usual manner in a punch press. The die or tool 29 includes a beveled portion 31 of a diameter at its largest portion corresponding to the inside diameter of the lips 18 and 19 so as to center a race ring with reference to the tool. An annular flange 32 adjacent the beveled portion 31 has a diameter such that it will clear the edge of the rim 20 (as shown in Fig. 5) of the grease groove 16 and yet rest upon the grease groove face of the lip 18. The same operation, of course, applies for the lip 19. The annular rim 32 is spaced from the main body portion 33 of the tool by a restricted connecting portion 34. The width of the portion 34 is such as to space the annular face 36 of the body portion 33 from the outside surface 20 of the race ring flange 13. This spacing equals the distance of movement of the die 29 to form or bend the lip 18. The engagement of the face 36 with the race ring flange limits and determines the amount of forming for the lip operated upon.

A second tool or die identical with tool 29 may be carried in the punch press so that the race ring 11 will lay between the two tools, and the lips 18 and 19 may be formed or bent simultaneously, or the bending operation can be applied to each lip 18 and 19 separately. If the two tools 29 are employed, one of the tools can be moved away from the other a sufficient distance to permit the race ring 11 to be introduced therebetween, and the formed race ring may be withdrawn in the same manner.

After the bending of the retaining lips as described above, the race ring is hardened and the retaining lips ground down so that the inside diameter of the lips is identical with the corresponding diameter of the rims 20 and 21. The final diameter is such that these portions of the outer race ring 11 will fit closely to the surface of an inner race ring 38 as shown in Fig. 2. This is a running fit so that the race rings 11 and 38 will clear one another yet fit as closely as possible so that all dirt and foreign matter are kept out of the raceway 12 and away from the rollers therein. As will be noted from a consideration of Figs. 3 and 4, Figs. 5 and 6, and Fig. 2, the grease grooves 16 and 17 are increased in total area after the bending of the retaining lips 18 and 19 so that a considerable quantity of grease can be retained therein. It is understood that the grease in these grooves acts not only to lubricate the bearing but also to exclude dirt and foreign matter therefrom.

After the completion of the outer race ring 11 the rollers 39 are placed therein. The length of each roller through its axial center corresponds substantially to the width of the raceway 12 intermediate the retaining shoulders 41 and 42 on the flanges 13 and 14 respectively. Inasmuch as the axial distance between the ends of the annular lips 18 and 19 is less than the axial length of each roller, such rollers are originally placed in the raceway by turning them slightly away from a line directly transversely of the raceway. Inasmuch as the full complement of rollers for the race ring 11 occupies substantially the circumferential length of the raceway 12, there is not enough room in the raceway to turn the last roller sufficiently to clear the two lips 18 and 19. In fact, normally the space available at the time of inserting the last roller is less than the diameter of such roller. The last roller therefore, as shown in Fig. 7, is inserted at one end between two adjacent rollers and pressed down pushing the rollers to each side sufficiently so that such end goes to the bottom of the raceway, and the roller is then pushed endwise so as to extend under the corresponding retaining lip. The other end of the roller as designated, for convenience, by reference character E in Fig. 7 rests on the top of the edge of the retaining lip 19. Due to the slight flexibility of the retaining lip, upon pressure against the end of the roller E, such roller is snapped past the retaining lip 19 to take a position in the raceway. As the roller E is placed into the raceway the adjacent rollers are pushed to each side to make a place for such roller, and the entire roller unit assumes its normal operating position.

In order to provide an effective length for each roller which is as long as possible for carrying a load, the radius of the spherical end 43 for the rollers is as great as possible. However, the curvature or radius of the lips 18 and 19 on the inside surface is taken into consideration with the radius of the ends 43 of the roller, or vice versa, so that the roller will make engagement substantially only in a point contact with the shoulders 41 and 42, and be retained against falling-out by the lips 18 and 19. At the same time however the rollers are maintained out of extensive contact with such lips so as to maintain the friction intermediate the rollers and raceway at a minimum.

The bearing is completed as shown in Fig. 1 and in cross section in Fig. 2, by merely sliding the inner race ring 38 into the outer race ring.

It is understood of course that a shaft sometimes acts as the inner race ring with the rollers bearing directly on such shaft. The inner race ring has a smooth engaging surface or raceway 46 for engagement with the rollers 39 when a load is applied on the bearing. Prior to this insertion the grease grooves 16 and 17 are filled with a suitable grease G. Lubrication of the bearing is also accomplished by oiling through the oil holes 24.

The disclosures of this application are illustrative and the invention is not to be limited by them. In fact, if modifications or improvements are not at once obvious they may be devised in the course of time to make additional use of the broad ideas taught and covered by this application. The claims are intended to point out novel features and not to limit the invention except as may be required by the prior art.

I claim:

1. A one-piece roller bearing race ring having a body portion, an annular raceway in said body portion having a roller retaining flange on each side thereof integral with the body portion for defining the axial limits of said raceway, an annular grease groove in each of said flanges intermediate the axial sides thereof and a yieldable retaining lip on each flange intermediate the grease groove therefor and the raceway, each of said lips being integral with its corresponding retaining flange, and said lips extending toward one another in a substantially arcuate configuration, and a plurality of rollers retained in said raceway by said retaining lips.

2. A roller bearing including in combination an inner race ring and an outer race ring telescopically disposed with respect to one another in a close but running fit, with one of said race rings carrying a plurality of rollers therein for bearing engagement with the other of said race rings, said one race ring including a pair of roller retaining flanges integral therewith and with said flanges being of such a configuration as to retain the rollers in said one race ring independently of the other race ring, and means for lubricating and sealing said bearing intermediate the two race rings to permit the movement of one race ring relative to the other and yet substantially exclude foreign matter from said bearing.

3. A roller bearing including in combination an inner race ring and an outer one-piece roller bearing race ring in a relatively close but running fit, said outer race ring having a rigid body portion of hardened steel throughout, an annular raceway in said body portion having a roller retaining flange on each side thereof integral with the rigid body portion for defining the axial limits of said raceway, each of said flanges having a resilient annular lip projecting into said raceway and a rigid supporting portion for the lip extending laterally of said lip with said lip and said supporting portion both being of the same inside diameter, a plurality of rollers in said raceway and retained therein by said resilient lips, said rigid lip supporting portions being adapted to prevent any axial movement of the flange relative to the rigid body portion of the race ring and means intermediate said flanges and the inner race ring for substantially excluding foreign matter from the bearing.

4. A bearing including in combination telescoping inner and outer race rings in a relatively close but running fit, one of said race rings being of one-piece and of hardened steel throughout, an annular flange at each side of said one race ring defining a raceway therebetween, bearing members retained in said raceway by said flanges independently of the other race ring, each of said flanges having an annular groove therein intermediate the outside and the raceway side of the flange with the flange portion on each side of said groove having the same internal diameter, and grease in each of said grooves lubricating intermediate the race rings and substantially sealing the axial sides of said bearing intermediate the two race rings to exclude foreign matter from the bearing.

5. A roller bearing including in combination an inner race ring and an outer race ring, telescopically disposed with respect to one another in a close but running fit, with one of said race rings carrying a plurality of rollers therein for bearing engagement with the other of said race rings, said one race ring including a flange at each of the axial sides thereof, and each flange having a substantially arcuately shaped lip thereon extending inwardly toward one another to define a raceway therebetween, rollers retained by said lips in said raceway independently of the other race ring, each of said flanges having an annular groove therein, and means in said groove to lubricate intermediate the two race rings and substantially seal said race rings against the introduction of foreign matter into the bearing.

6. A one-piece roller bearing race ring provided in steel and hardened throughout having an annular raceway therein, a roller retaining flange on each side of said raceway, an annular yieldable retaining lip on each flange extending in a substantially arcuate configuration toward the raceway and said lips acting together to retain rollers intermediate the same, a plurality of rollers retained in said raceway by said retaining lips, and an annular grease groove in each flange intermediate the outside and the raceway side thereof, with the portions of the flange on each side of the annular groove having the same inside diameter.

OTTO STORZ.